(12) United States Patent
Jacobsen et al.

(10) Patent No.: US 11,766,088 B2
(45) Date of Patent: *Sep. 26, 2023

(54) FOOTWEAR CUSHION WITH INTERNAL CONFORMAL ELECTRONICS

(71) Applicant: NIKE, Inc., Beaverton, OR (US)

(72) Inventors: Nathan Andrew Jacobsen, Portland, OR (US); Holli Pheil, Portland, OR (US); Drew McLain Skeels, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 281 days.

This patent is subject to a terminal disclaimer.

(21) Appl. No.: 16/874,051

(22) Filed: May 14, 2020

(65) Prior Publication Data

US 2020/0268093 A1 Aug. 27, 2020

Related U.S. Application Data

(62) Division of application No. 15/577,436, filed as application No. PCT/US2016/034785 on May 27, 2016, now Pat. No. 10,687,578.

(Continued)

(51) Int. Cl.
  *A43B 3/34* (2022.01)
  *A43B 13/20* (2006.01)
  (Continued)

(52) U.S. Cl.
  CPC .............. *A43B 3/34* (2022.01); *A43B 7/144* (2013.01); *A43B 13/023* (2013.01); *A43B 13/04* (2013.01);
  (Continued)

(58) Field of Classification Search
  CPC ......... A43B 3/34; A43B 7/144; A43B 13/023; A43B 13/04; A43B 13/189; A43B 13/20;
  (Continued)

(56) References Cited

U.S. PATENT DOCUMENTS

| 4,906,502 A | 3/1990 | Rudy | |
| 5,083,361 A * | 1/1992 | Rudy | ........................ B32B 7/02 |
| | | | 29/454 |

(Continued)

FOREIGN PATENT DOCUMENTS

| CN | 1038018 A | 12/1989 |
| CN | 1192660 A | 9/1998 |

(Continued)

OTHER PUBLICATIONS

"U.S. Appl. No. 15/577,436, Examiner Interview Summary dated Jan. 22, 2020", 3 pgs.

(Continued)

*Primary Examiner* — Christopher W Raimund
(74) *Attorney, Agent, or Firm* — Schwegman, Lundberg & Woessner, P.A.

(57) ABSTRACT

An article of footwear can comprise: an upper, and a sole assembly connected to the upper to form a receptacle for a human foot, the sole assembly can comprise: a cushion comprising an exterior wall that forms an enclosure; an antenna disposed within the enclosure; and a microchip connected to the antenna. A method of manufacturing an article of footwear can comprise: positioning an electronic communication device between two plies of polymer laminate; heating the two plies of polymer laminate to form a weld area and a cushion area, wherein the electronic communication device becomes encapsulated between the two plies of polymer laminate, inflating the cushion area with a gas; and sealing the cushion area.

14 Claims, 7 Drawing Sheets

Related U.S. Application Data

(60) Provisional application No. 62/167,720, filed on May 28, 2015.

(51) Int. Cl.

| | |
|---|---|
| *A43B 13/04* | (2006.01) |
| *A43B 7/144* | (2022.01) |
| *A43B 13/02* | (2022.01) |
| *A43B 21/26* | (2006.01) |
| *H01Q 1/38* | (2006.01) |
| *A43B 21/28* | (2006.01) |
| *B32B 37/04* | (2006.01) |
| *D03D 1/00* | (2006.01) |
| *H01Q 1/22* | (2006.01) |
| *B32B 37/00* | (2006.01) |
| *B29C 65/24* | (2006.01) |
| *B29D 35/12* | (2010.01) |
| *A43B 13/18* | (2006.01) |
| *H01Q 1/27* | (2006.01) |
| *H01Q 7/00* | (2006.01) |
| *H04B 5/00* | (2006.01) |

(52) U.S. Cl.
CPC ............ *A43B 13/189* (2013.01); *A43B 13/20* (2013.01); *A43B 21/265* (2013.01); *A43B 21/28* (2013.01); *B29C 65/242* (2013.01); *B29D 35/122* (2013.01); *B32B 37/0076* (2013.01); *B32B 37/04* (2013.01); *D03D 1/0088* (2013.01); *H01Q 1/2225* (2013.01); *H01Q 1/273* (2013.01); *H01Q 1/38* (2013.01); *H01Q 7/00* (2013.01); *A43B 13/186* (2013.01); *B32B 2305/342* (2013.01); *H04B 5/0062* (2013.01)

(58) Field of Classification Search
CPC ..... A43B 21/265; A43B 21/28; A43B 13/186; A43B 13/125; A43B 13/206; A43B 13/24; B29C 65/242; B29D 35/122; B32B 37/0076; B32B 37/04; B32B 2305/342; D03D 1/0088; H01Q 1/2225; H01Q 1/273; H01Q 1/38; H01Q 7/00; H04B 5/0062; G01S 19/01
See application file for complete search history.

(56) References Cited

U.S. PATENT DOCUMENTS

| | | | |
|---|---|---|---|
| 5,500,065 A | 3/1996 | Koch et al. | |
| 5,815,954 A | 10/1998 | Huang | |
| 5,875,571 A | 3/1999 | Huang | |
| 6,891,474 B1 | 5/2005 | Fletcher | |
| 7,980,009 B2 | 7/2011 | Carnes et al. | |
| 8,308,073 B2 | 11/2012 | Lai et al. | |
| 8,461,979 B2 | 6/2013 | Case, Jr. | |
| 8,789,294 B2 | 7/2014 | Dojan et al. | |
| 10,687,578 B2 | 6/2020 | Jacobsen et al. | |
| 2006/0043198 A1* | 3/2006 | Forster | H01Q 5/40 235/492 |
| 2006/0225304 A1 | 10/2006 | Goodwin | |
| 2007/0129907 A1 | 6/2007 | Demon | |
| 2007/0199988 A1* | 8/2007 | Labgold | G06Q 30/06 235/385 |
| 2007/0260421 A1 | 11/2007 | Berner, Jr. et al. | |
| 2010/0063779 A1 | 3/2010 | Schrock et al. | |
| 2011/0260857 A1 | 10/2011 | Hamill | |
| 2012/0096743 A1 | 4/2012 | Surve | |
| 2012/0234111 A1 | 9/2012 | Molyneux et al. | |
| 2012/0234921 A1 | 9/2012 | Tiedmann et al. | |
| 2012/0291563 A1 | 11/2012 | Schrock et al. | |
| 2012/0291564 A1 | 11/2012 | Amos et al. | |
| 2012/0293326 A1* | 11/2012 | Case, Jr. | G06Q 30/0261 36/83 |
| 2013/0006583 A1 | 1/2013 | Weast et al. | |
| 2013/0061396 A1 | 3/2013 | Laflèche et al. | |
| 2013/0118039 A1 | 5/2013 | Peterson et al. | |
| 2014/0132472 A1 | 5/2014 | Tichauer et al. | |
| 2014/0165427 A1 | 6/2014 | Molyneux et al. | |
| 2018/0078207 A1 | 3/2018 | Moran et al. | |
| 2018/0132559 A1 | 5/2018 | Jacobsen et al. | |

FOREIGN PATENT DOCUMENTS

| | | |
|---|---|---|
| CN | 1600191 A | 3/2005 |
| CN | 101454812 A | 6/2009 |
| CN | 102673977 | 9/2012 |
| CN | 103648317 A | 3/2014 |
| CN | 103720115 | 4/2014 |
| CN | 107690291 A | 2/2018 |
| CN | 107690291 | 6/2021 |
| CN | 113397272 | 9/2021 |
| JP | 2002272505 A | 9/2002 |
| KR | 101008305 | 1/2011 |
| WO | WO-2011066358 A1 | 6/2011 |
| WO | WO-2014053588 A1 | 4/2014 |
| WO | WO-2016191730 A1 | 12/2016 |

OTHER PUBLICATIONS

"U.S. Appl. No. 15/577,436, Non Final Office Action dated Sep. 26, 2019", 5 pgs.
"U.S. Appl. No. 15/577,436, Notice of Allowance dated Feb. 13, 2020", 6 pgs.
"U.S. Appl. No. 15/577,436, Response filed Jan. 27, 2020 to Non Final Office Action dated Sep. 26, 2019", 14 pgs.
"U.S. Appl. No. 15/577,436, Response filed Sep. 11, 2019 to Restriction Requirement dated Jul. 22, 2019", 7 pgs.
"U.S. Appl. No. 15/577,436, Restriction Requirement dated Jul. 22, 2019", 6 pgs.
"Chinese Application Serial No. 201680030564.7, Office Action dated Nov. 25, 2019", w/o English translation, 11 pgs.
"European Application Serial No. 16800829.0, Extended European Search Report dated Jun. 25, 2019", 11 pgs.
"European Application Serial No. 16800829.0, Partial Supplementary European Search Report Mar. 18, 2019", 12 pgs.
"European Application Serial No. 16800829.0, Response filed Jan. 2, 2020 to Extended European Search Report dated Jun. 25, 2019", 19 pgs.
"European Application Serial No. 16800829.0, Response filed Jun. 22, 2018 to Communication Pursuant to Rules 161 (2) and 162 EPC dated Jan. 17, 2018", 10 pgs.
"International Application Serial No. PCT/US2016/034785, International Preliminary Report on Patentability dated Dec. 7, 2017", 13 pgs.
"International Application Serial No. PCT/US2016/034785, International Search Report dated Sep. 12, 2016", 4 pgs.
"International Application Serial No. PCT/US2016/034785, Written Opinion dated Sep. 12, 2016", 11 pgs.
You, Baiqiang, et ai., "Experiments on Electromagnetic Field and Microwave Technology", (Aug. 31, 2008).
"Chinese Application Serial No. 201680030564.7, Response filed Jan. 19, 2021 to Office Action dated Sep. 4, 2020", w/ English Claims, 7 pgs.
"Chinese Application Serial No. 201680030564.7, Response to Examiner Telephone Interview filed Mar. 16, 2021", w/ English claims, 5 pgs.
"Chinese Application Serial No. 201680030564.7, Response filed May 22, 2020 to Office Action dated Nov. 25, 2019", w/ English claims, 13 pgs.
"Chinese Application Serial No. 201680030564.7, Office Action dated Sep. 4, 2020", w English translation, 18 pgs.
U.S. Appl. No. 15/577,436, filed Nov. 28, 2017, Footwear Cushion With Internal Conformal Electronics.
"Chinese Application Serial No. 202110646467.3, Office Action dated Mar. 23, 2022", With English translation, 16 pgs.

(56) References Cited

OTHER PUBLICATIONS

"European Application Serial No. 16800829.0, Communication Pursuant to Article 94(3) EPC dated Jul. 8, 2022", 7 pgs.

"Chinese Application Serial No. 202110646467.3, Decision of Rejection dated Jan. 11, 2023", w/o English Translation, 5 pgs.

"Chinese Application Serial No. 202110646467.3, Response filed Sep. 22, 2022 to Office Action dated Mar. 23, 2022", w/ English Claims, 31 pgs.

"European Application Serial No. 16800829.0, Response filed Nov. 16, 2022 to Communication Pursuant to Article 94(3) EPC dated Jul. 8, 2022", 39 pgs.

* cited by examiner

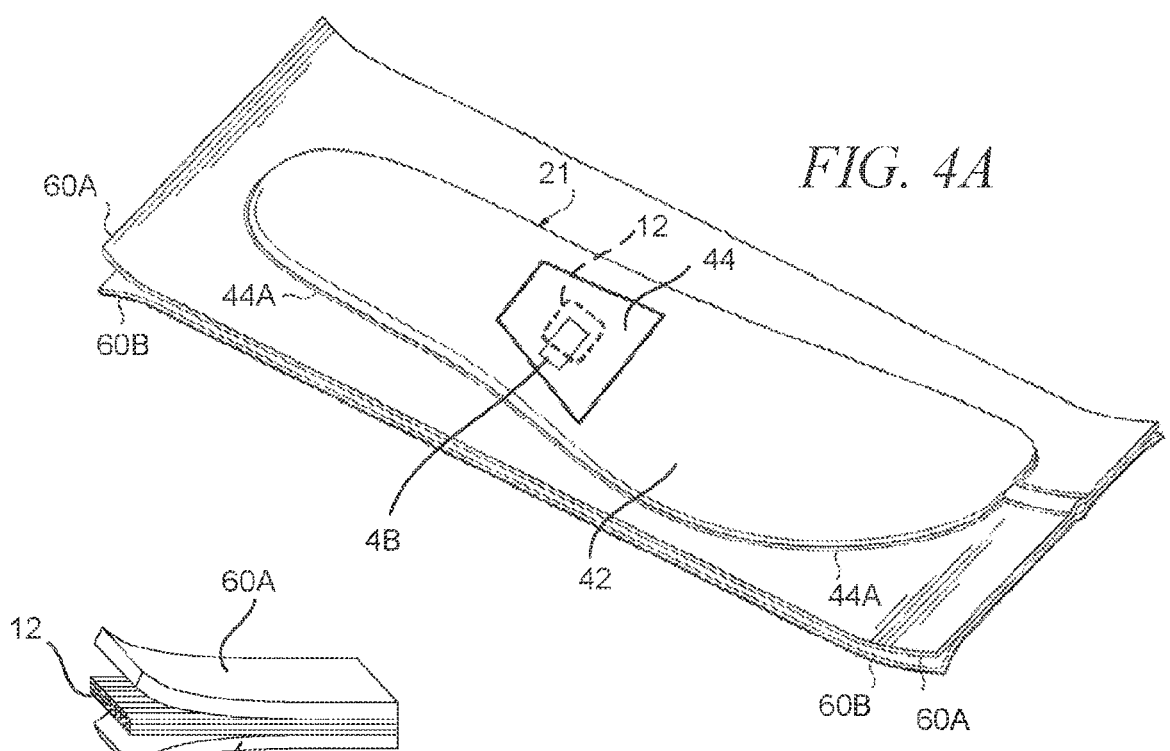
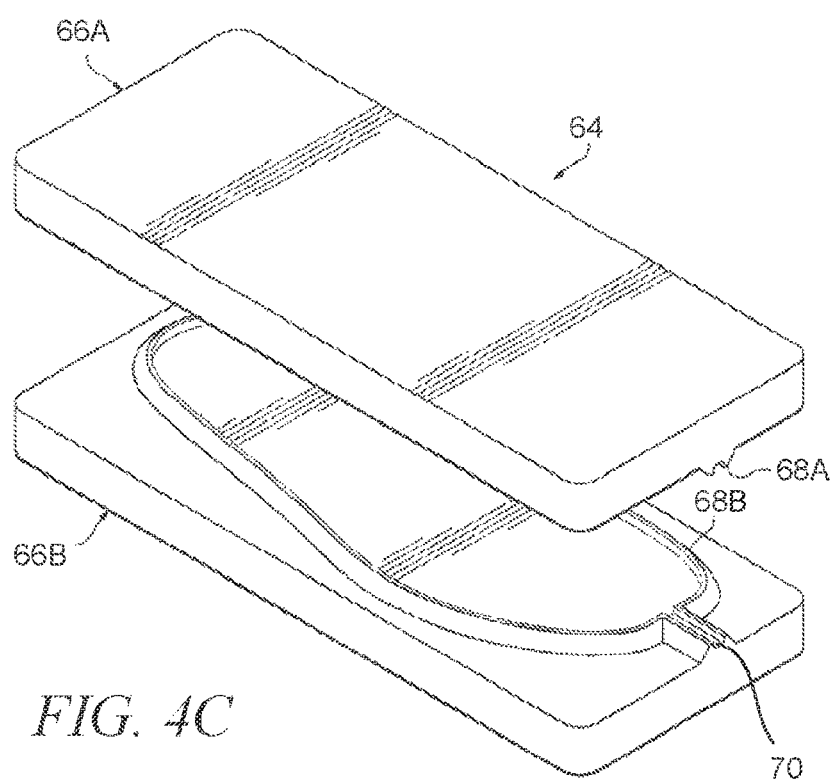

FOOTWEAR CUSHION WITH INTERNAL CONFORMAL ELECTRONICS

PRIORITY CLAIM

This patent application is a divisional application of U.S. patent application Ser. No. 15/577,436, filed Nov. 28, 2017, which application is a U.S. National Stage Filing under 35 U.S.C. 371 from International Patent Application Serial No. PCT/US2016/034785, filed May 27, 2016, published on Dec. 1, 2016 as WO2016/191730 A1, which claims the benefit of priority of U.S. Provisional Patent Application Ser. No. 62/167,720, filed on May 28, 2015, all of which are incorporated by reference herein in their entireties.

TECHNICAL FIELD

The subject matter disclosed herein generally relates to footwear. More specifically, the subject matter relates to footwear incorporating electronic communication devices.

BACKGROUND

Apparel, clothing items, footwear and other articles are susceptible to counterfeiting, particularly those of famous and highly desirable brands. Some counterfeit articles can be difficult to distinguish from authentic articles to the untrained eye or the undiscerning individual. Better counterfeit articles can be almost indistinguishable from authentic articles even by experts and professional testing equipment.

Many systems and devices have been developed to identify authentic items with an absolute degree of certainty. U.S. Pat. No. 6,891,474 to Fletcher describes many such systems in the Background section and is itself directed to the use of Radio Frequency Identification (RFID) tags to verify the authenticity of articles. However, incorporation of RFID tags into apparel can be difficult in a manner that prevents detection, tampering and removal of the tag. For example, U.S. Pat. No. 8,308,073 to Lai et al describes an RFID tag incorporated into the laces of a shoe.

BRIEF DESCRIPTION OF THE DRAWINGS

Some embodiments are illustrated by way of example and not limitation in the figures of the accompanying drawings.

FIG. 4A is a perspective view of the air cushion of FIG. 3 showing two membrane plies after being adhered and molded into the air cushion, but before trimming.

FIG. 4B is a close up cut-away view schematically showing the NFC antenna of FIG. 4A disposed between the two membrane plies at callout 4B.

FIG. 4C is a perspective view of a thermoforming apparatus that can be used to adhere and mold membrane plies with an NFC antenna therebetween.

DETAILED DESCRIPTION

The present inventors have recognized, among other things, that problems to be solved with conventional RFID authentication tags can include protecting the tag from environmental damage, among other things. In an example, the subject matter described in this disclosure can provide a solution to this problem by providing an article of footwear comprising: an upper; and a sole assembly connected to the upper to form a receptacle for a human foot, the sole assembly comprising: a cushion comprising an exterior wall that forms an enclosure; an antenna disposed within the enclosure; and a microchip connected to the antenna.

Figure 1:
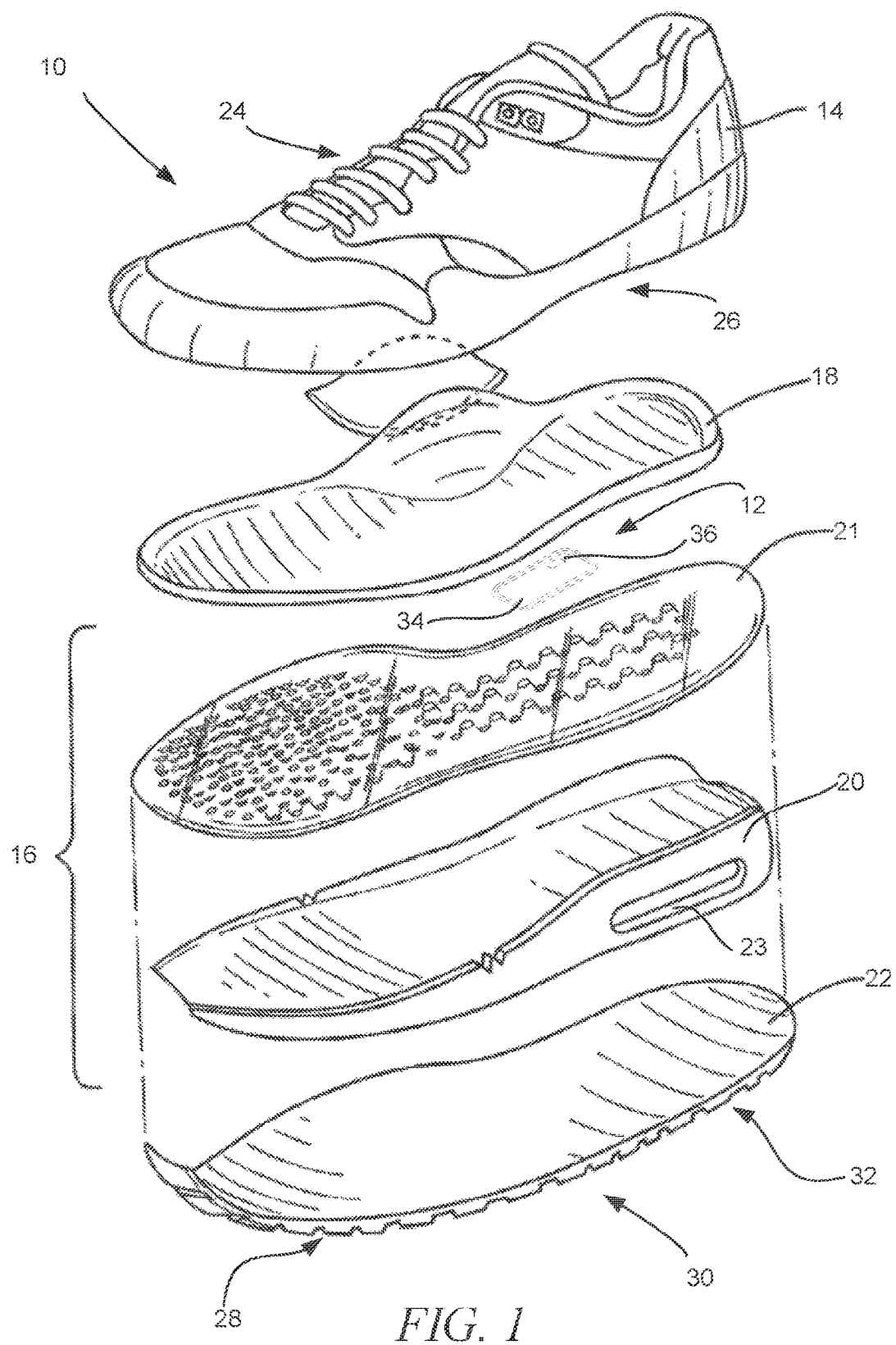
FIG. 1 is an exploded perspective view of a shoe incorporating a sole assembly having a cushion with an embedded near field communication (NFC) antenna.

FIG. 1 is an exploded perspective view of shoe 10 incorporating near field communication (NFC) device 12. Shoe 10 can comprise upper 14 and sole assembly 16. A foot of a wearer of shoe 10 can rest on sole assembly 16, while upper 14 surrounds the foot to maintain the foot inserted into shoe 10. Sole assembly 16 can comprise insole 18, midsole 20, cushion 21 and outsole 22. Insole 18 can be inserted into upper 14. Midsole 20 can be attached to the bottom of upper 14. Outsole 22 can be attached to the bottom of midsole 20. Cushion 21 can preferably be incorporated into sole assembly 16 so as to be viewable in window 23 of midsole 20. Cushion 21 can be incorporated into midsole 20 by any conventional technique such as foam encapsulation or placement in a cut-out portion of a foam midsole. Cushion 21 can be configured to include embedded therein device 12 for receiving and transmitting signals with an interrogation device. Cushion 21 can provide a clean, low wear, safe and hidden location for device 12.

Shoe 10 has medial, or inner, side 24 and lateral, or outer, side 26. For purposes of general reference, shoe 10 may be divided into three general portions: forefoot portion 28, mid-foot portion 30, and heel portion 32. Portions 28, 30 and 32 are not intended to demarcate precise areas of shoe 10, rather, they are intended to represent general areas of shoe 10 that provide a frame of reference during the following discussion, as is discussed below in the Additional Notes section. Furthermore, although the present description is written with reference to an athletic shoe, the disclosure of the present application can be applied equally to other types of footwear, such as, but not limited to, dress shoes, running shoes, golf shoes, tennis shoes, sandals, boots, slippers and the like.

Sole assembly 16, which is generally disposed between the foot of the wearer and the ground, provides attenuation of ground reaction forces (i.e. imparting cushioning), traction, and may control foot motions, such as pronation. Insole 18 can typically comprises a removable insert disposed atop cushion 21 or midsole 20, and can provide additional cushioning or ventilation (e.g. by including perforations) Midsole 20 can be attached to upper 14 and function as the primary shock-attenuating and energy-absorbing component of shoe 10. Midsole 20 can be secured to upper 14 by adhesive or other suitable means. Suitable materials for midsole 20 include polymer foam materials such as ethylvinylacetate or polyurethane, or any other material that compresses resiliently. Outsole 22 can be attached to the lower surface of midsole 20 by adhesive or other suitable means. Suitable materials for outsole 22 include polymers, e.g., polyether-block co-polyamide polymers (sold as Pebax® by ATOFINA Chemicals of Philadelphia, Pa.), and nylon resins such as Zytel®, sold by Dupont. Other suitable materials for outsole 22 will become readily apparent to those skilled in the art, given the benefit of this disclosure. In certain embodiments, sole assembly 16 may not include an outsole layer separate from midsole 20 but, rather, the outsole may comprise a bottom surface of midsole 20 that provides the external traction surface of sole assembly 16.

Various embodiments of device 12 of the present disclosure can be incorporated into various designs of cushion 21. For example, cushion 21 may comprise an air bladder comprising two plies of polymeric membrane, as is described in U.S. Pat. No. 5,802,739 to Potter et al. In another embodiment, a four-ply air bladder may be used, as is described in U.S. Pat. No. 6,402,879 to Tawney et al. In yet another embodiment, a fabric cushioning element may be used, as is described in U.S. Pat. No. 8,764,931 to Turner. The entire contents of U.S. Pat. Nos. 5,802,739; 6,402,879; and 8,764,931 are hereby incorporated by this reference for all purposes. In yet other embodiments, a bladder may be filled with other gases, such as nitrogen, helium or so-called dense gases such as sulfur hexafluoride, a liquid, or gel.

Device 12 can include coil 34 and microchip 36. Device 12 can be configured as a near field communication (NFC) antenna. For example, device 12 can comprise a thin wire of copper that is wound in a flat spiral, with ends of the wire connected to microchip 36. In another example, device 12 can be configured as a radio frequency identification (RFID) tag Near field communication devices can typically operate at the same frequency (13.56 MHz) as High Frequency RFID readers and tags. The standards and protocols of the NFC format are based on RFID standards outlined in the following standards, which are directed to RFID proximity cards.

ISO/IEC 14443-1:2008 Identification cards—Contactless integrated circuit cards—Proximity cards—Part 1: Physical characteristics:

ISO/IEC 14443-2:2010 Identification cards—Contactless integrated circuit cards—Proximity cards—Part 2: Radio frequency power and signal interface.

ISO/IEC 14443-3:2011 Identification cards—Contactless integrated circuit cards—Proximity cards—Part 3: Initialization and anticollision; and ISO/IEC 14443-4:2008 Identification cards—Contactless integrated circuit cards—Proximity cards—Part 4: Transmission protocol.

Device 12 is described in the disclosure as being an NFC device by way of example only. In other examples, other wireless modalities may be implemented according to the same principles described with respect to an NFC device. For example, ultra high frequency (UHF) devices may be used. UHF wireless communication may vary in operation frequency between and among certain countries, but in general may be understood to occur over the range of approximately 300 megahertz (MHz) to approximately three (3) gigahertz (GHz). Certain regions throughout the world utilize a variety different of industrial, scientific, and medical (ISM) bands for UHF communications. Certain ISM bands are centered around approximately 900 MHz, with the center frequencies of those bands falling generally within the range of approximately 869 MHz to approximately 915 MHz.

In an example, an antenna is configured to communicate according to a UHF standard, including any one or more of Gen2 or ISO 18000-6C (again including versions of those standards that are past, current or that may be developed). In an example, an antenna is configured to communicate according to any one or more standards including ISO 14443B. ISO 1443A NFC Type 4, and ISO 15693 (including contemporary and previous versions of those standards as well as versions of those standards that are yet to be promulgated or adopted).

In other embodiments, device 12 can be configured to enhance signal transmission in order to facilitate transmission through the wearer and material of shoe 10 (FIG. 1). For example, device 12 can include two antennas that are tuned differently, one being conventionally tuned, and the other being tuned so as to accommodate transmission through a human body or configured to communicate at a different frequency. Such devices are described in U.S. Provisional Patent Application No. 62/144,773, entitled "Multi-Antenna Tuned UHF Footwear" and filed Apr. 8, 2015, the entire contents of which are hereby incorporated by this reference for all purposes.

In yet other examples, device 12 may comprise a Bluetooth communication device, or another active or passive device.

NFC devices suitable for use with the cushions of the present disclosure are positioned within cushion 21 so as to facilitate transition of communication signals through the various layers of upper 14 and sole assembly 16. As such, device 12 can be positioned as close as possible to an outer surface of shoe 10. As discussed with reference to FIG. 2, device 12 can communicate with an electronic interrogation device to receive information relating to shoe 10.

Figure 2:
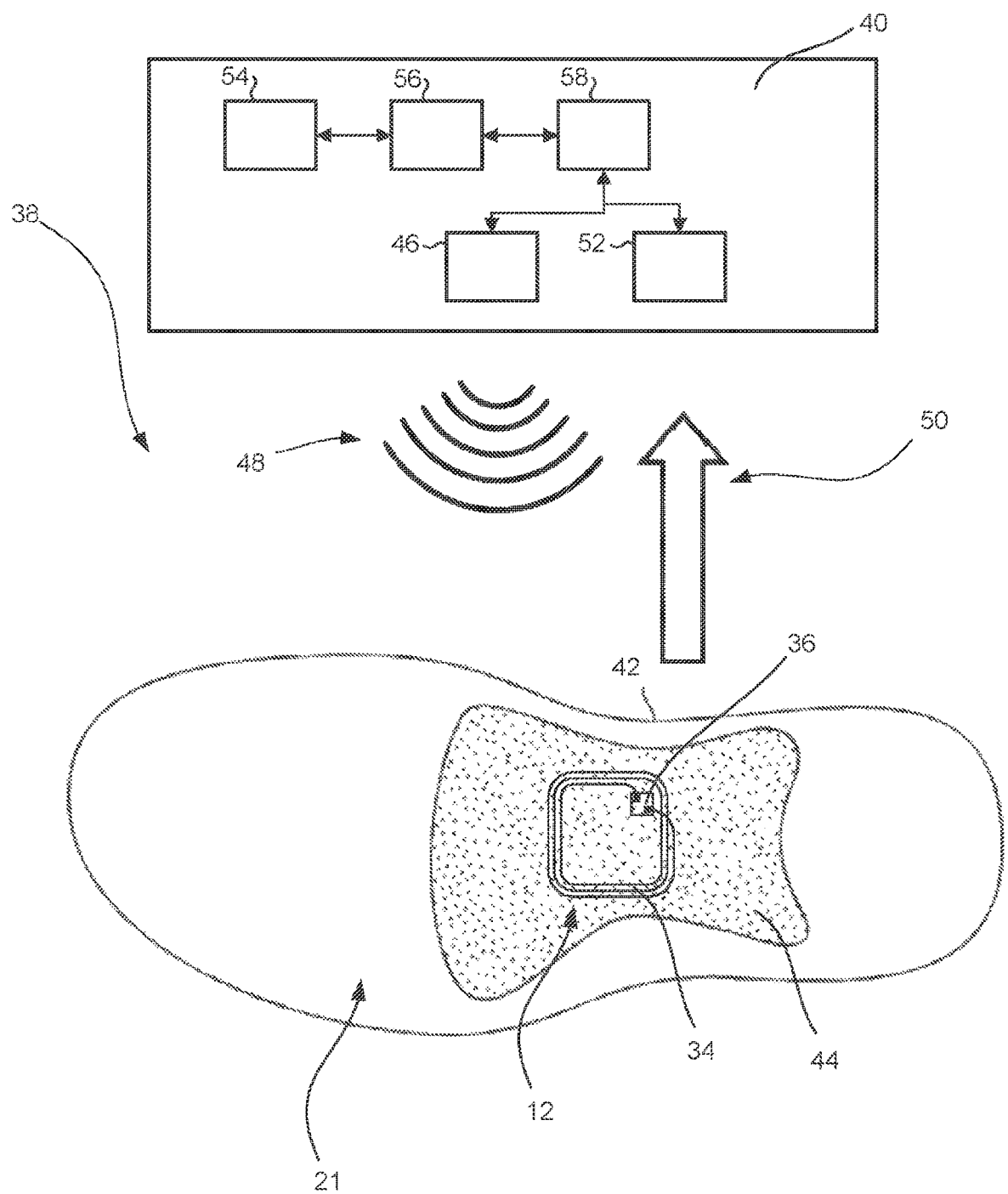
FIG. 2 is a schematic diagram of an NFC circuit having a shoe sole including an NFC antenna configured to exchange data with an interrogation device.

FIG. 2 is a block diagram of NFC communication system 38 in which shoe cushion 21 includes NFC device 12 configured to exchange data with interrogation device 40. Shoe cushion 21 can include air bladder 42 that surrounds weld area 44. Device 12 can include coil 34 and microchip 36, and can be embedded in weld area 44. Interrogation device 40 can be an active device that includes generator 46 for generating signal 48 that can power and activate device 12. Specifically, signal 48 can comprise a high frequency radio wave that causes current to be generated in coil 34, thereby providing power to microchip 36. Signal 48 can simultaneously carry data to microchip 30 that can be read and stored when powered. In reply, device 12 can generate signal 50 that can be read by reader 52 of interrogation device 40. Signal 50 can also comprise a radio wave that carries data stored in microchip 36.

Interrogation device 40 can also include other components, such as input/output device 54, memory 56 and circuitry 58, that allow an operator of system 38 to write data to and receive data from microchip 36. Circuitry 58 can include a transceiver, a voltage rectifier and a modulator, as appropriate for device 12. Memory 56 can comprise any suitable electronic data storage medium, such as an electrically erasable programmable read-only memory ("EEPROM") circuit. Further description of antennas and interrogation devices that can be used in accordance with the present disclosure is found in U.S. Pat. No. 8,461,979 to Case, Jr., the entire contents of which are hereby incorporated by this reference for all purposes.

Authentication information from the manufacturer of shoe 10 (FIG. 1) can be stored in microchip 36 to verify the origin of shoe 10, which can aid in preventing trafficking of counterfeit articles. Also, microchip 36 can include information concerning the owner of shoe 10, which can be updated by interrogation device 40, in order to identify stolen goods. Device 12 can be located sufficiently close to the outside of cushion 21 such that signals 48 and 50 can readily communicate with each other. However, device 12 can be located further within the interior of cushion 21 so as to be discreet and protected from tampering and wear.

Figure 3:
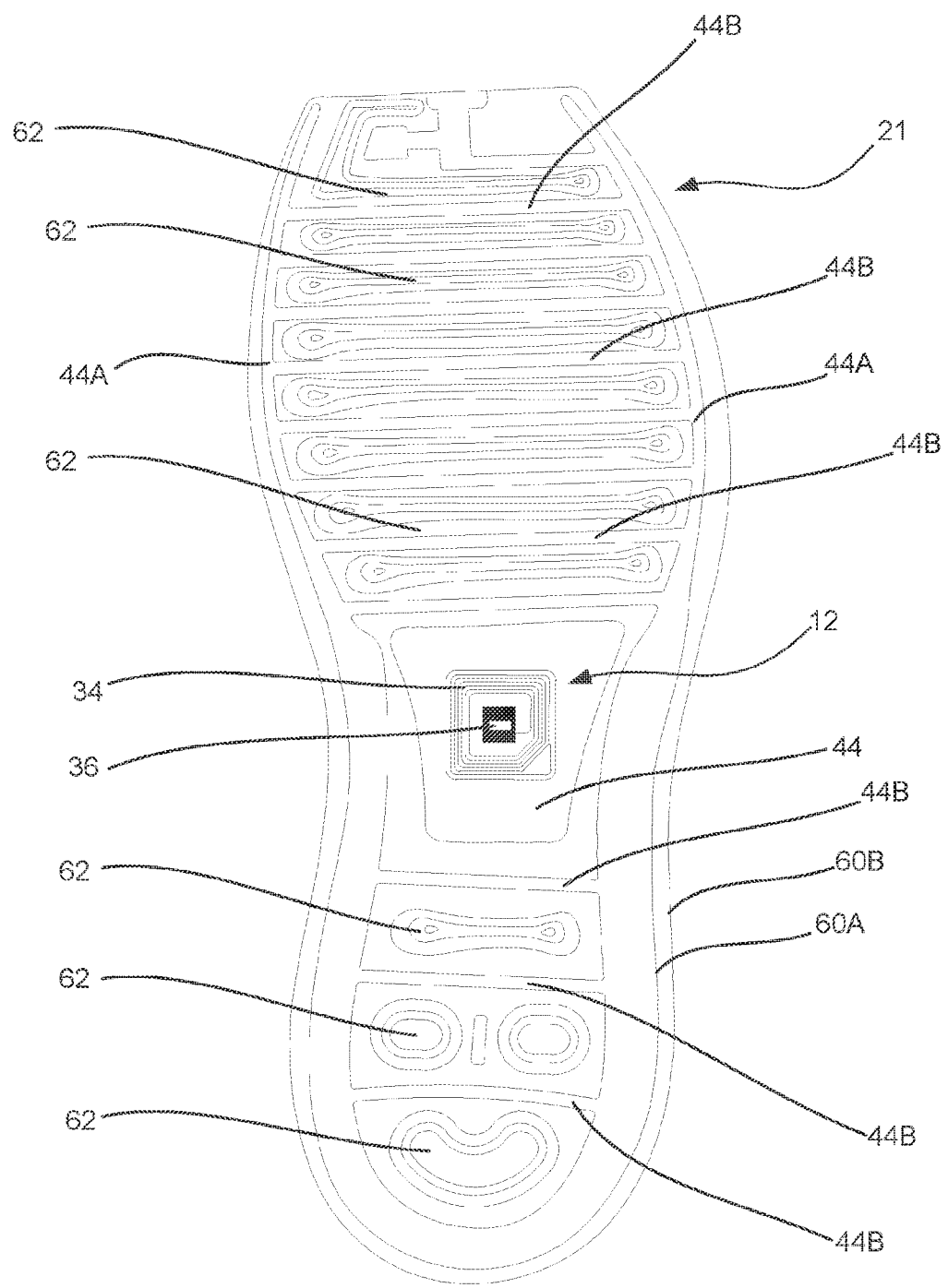
FIG. 3 is a plan view of an air cushion having an NFC antenna disposed in a weld area between two membrane plies at an arch location.

FIG. 3 is a top plan view of cushion 21 having NFC device 12 disposed in weld area 44 of membranes 60A and 60B (FIG. 4A) in mid-foot portion 30 (FIG. 1), which can correspond to an arch location on a foot. Cushion 21 can also include perimeter weld 44A that circumscribes cushion 21, and a plurality of cross-welds 44B that generate chambers 62 in air bladder 42 (FIG. 2) of membranes 60A and 60B. In the example show n, weld area 44 can circumscribe device 12, thereby encapsulating device 12 and protecting it from environmental elements.

Cushion 21 can be manufactured by a two-film technique, often referred to as twin-sheet bonding, wherein two separate layers, or plies, of elastomeric film, or membranes 60A and 60B, are formed to have the overall shape of cushion 21. The layers can be welded together at perimeter weld 44A to form an upper exterior surface, a lower exterior surface, and exterior sidewalls of cushion 21. The layers can be trimmed or initially shaped so that their outer peripheries have the desired shape of cushion 21. The layers can be welded together at predetermined interior locations at cross-welds 44B to impart a desired configuration to air bladder 42. That is, interior portions of the layers can be connected to form chambers 62 of a predetermined shape and size at desired locations. Cushion 21 can then be subsequently pressurized above ambient pressure by inserting a nozzle or needle, which is connected to a fluid pressure source, into a fill inlet formed in cushion 21. After chambers 62 are pressurized, the nozzle is removed and the fill inlet is sealed, by welding for example. According to the present disclosure, cushion 21 can include device 12 embedded in weld area 44 directly between membranes 60A and 60B.

FIG. 4A is a perspective view of cushion 21 of FIG. 3 showing two plies, membranes 60A and 60B, after being adhered and molded into air cushion 21. FIG. 4B is a close up cut-away view schematically showing a portion of device 12 disposed between membranes 60A and 60B at callout 4B of FIG. 4A. FIG. 4C is a perspective view thermoforming apparatus 64 that can be used to adhere and mold membranes 60A and 60B with device 12 therebetween, as shown in FIG. 4A.

Thermoforming apparatus 64 can be utilized in the manufacturing process of cushion 21 and is depicted as including upper mold portion 66A and lower mold portion 66B. In general, the process involves utilizing thermoforming apparatus 64 to (a) bond device 12 to each of membranes 60A and 60B. (b) shape membranes 60A and 60B, and (c) form weld area 44, perimeter weld 44A and cross-welds 44B between membranes 60A and 60B.

Initially, before insertion into thermoforming apparatus 64, membranes 60A and 60B can be pre-heated to a temperature that facilitates bonding between the components, e.g. device 12. Depending upon the specific materials utilized for membranes 60A and 60B, suitable temperatures may range from 120 to 200 degrees Celsius (248 to 392 degrees Fahrenheit) or more. As an example, a material having alternating layers of thermoplastic polyurethane and ethylene-vinyl alcohol copolymer may be heated to a temperature in a range of 149 to 188 degrees Celsius (300 and 370 degrees Fahrenheit) to facilitate bonding. Various radiant heaters, radio frequency heaters, or other devices can be utilized to heat the components of cushion 21. In some manufacturing processes, thermoforming apparatus 64 can be heated such that contact between thermoforming apparatus 64 and the components of cushion 21 raises the temperature of the components to a level that facilitates bonding.

Following pre-heating, the components of cushion 21, e.g. membranes 60A and 60B and device 12, can be located between mold portions 66A and 66B. In order to properly position the components, a shuttle frame or other device may be utilized. Coil 34 and microchip 36 can be disposed on a substrate to facilitate positioning between membranes 60A and 60B. For example, coil 34 and microchip 36 can be deposited, or otherwise disposed, on a silicon wafer, a plastic substrate or a paper sheet. In other examples, coil 34 and microchip 36 are free-standing components positioned directly between membranes 60A and 60B. In yet another example, coil 34 can be digitally or screen printed directly onto a substrate using conductive ink. Conductive inks, such as silver or copper, can be printed directly onto surfaces where it would otherwise be difficult to insert a pre-fabricated antenna. Conductive inks are also advantageous in producing multiple antenna devices with custom configurations, as discussed above with reference to U.S. Provisional Application No. 62/144,773. An example ink that is suitable for use with the devices disclosed herein is a pure copper ink commercially available from DuPont Microcircuit Materials under the name DuPont™ PE510. DuPont™ PE510 can be printed onto various substrates suitable for use in sole assembly 16 (FIG. 1), such as plastics, and can withstand washcycles and is, therefore, suitable for use in high stress environments.

Once positioned, mold portions 66A and 60B can translate toward each other and begin to close upon the components such that (a) ridge 68A of upper mold portion 66A contacts membrane 60A, (b) ridge 68B of lower mold portion 66B contacts membrane 60B, and (c) membranes 60A and 60B begin bending around device 12 so as to extend into a cavity within thermoforming apparatus 64 having the shape of cushion 21. Additionally, mold portions 66A and 66B can include other ridges (not shown) to form weld area 44 and cross-welds 44B. Accordingly, the components are located relative to thermoforming apparatus 64 and initial shaping an positioning has occurred.

Air can be partially evacuated from the area around membranes 60A and 60B through various vacuum ports in mold portions 66A and 66B. The purpose of evacuating the air can be to draw membranes 60A and 60B into contact with the various contours of thermoforming apparatus 64. This can ensure that membranes 60A and 60B are properly shaped in accordance with the contours of thermoforming apparatus 64. Note that membranes 60A and 60B may stretch in order to extend around device 12 and into thermoforming apparatus 64.

In order to provide a second means for drawing membranes 60A and 60B into contact with the various contours of thermoforming apparatus 64, the area between membranes 60A and 60B can be pressurized. During a preparatory stage of this method, an injection needle can be located between membranes 60A and 60B, and the injection needle can be located such that ridges 68A and 68B envelop the injection needle when thermoforming apparatus 64 closes, such as at inlet 70. A gas can then be ejected from the injection needle such that membranes 60A and 60B engage ridges 68A and 68B, thereby forming an inflation conduit between membranes 60A and 60B. The gas can then pass through the inflation conduit, thereby entering and pressurizing the area between membranes 60A and 60B. In combination with the vacuum, the internal pressure ensures that membranes 60A and 60B contact the various portions of thermoforming apparatus 64. As thermoforming apparatus 64 closes further, ridges 68A and 68B bond membranes 60A and 60B together, as depicted FIG. 4A, thereby forming perimeter weld 44A.

When bonding is complete, thermoforming apparatus 64 can be opened and membranes 60A and 60B can be permitted to cool. A fluid or gas, such as nitrogen, can be injected into cushion 21 through the inflation conduit at inlet 70 in order to inflate chambers 62 (FIG. 3). In addition, a sealing process can be utilized to seal the inflation conduit adjacent to cushion 21 at inlet 70 after pressurization. The excess portions of membranes 60A and 60B, as shown m FIG. 4A, can then be removed, thereby completing the manufacture of cushion 21. As an alternative, the order of inflation and removal of excess material can be reversed. As a final step in the process, cushion 21 can be tested and then incorporated into midsole 20 of shoe 10 (FIG. 1). Alternatively, membranes 60A and 60B can be initially trimmed to the shape of cushion 21 before bonding.

Weld area 44 can be configured to provide an environmentally safe, and discrete location for device 12. For example, mold portions 66A and 66B can be configured to include ridges for forming weld area 44. The ridges can also include slight depressions that mate and have the shape and thickness (combined) of device 12, thereby providing a small pocket within weld area 44 for device 12. Alternatively, only one of mold portions 66A and 66B can be configured to form a pocket for device 12. In either case, the outer periphery of weld area 44 can be tightly formed to seal-in device 12, while the interior portion of weld area 44 can be slightly larger to not damage device 12 during manufacture.

Manufactured according to the above process, membranes 60A and 60B are disposed against device 12, as shown in FIG. 4B, to thereby encapsulate device 12. Membranes 60A and 60B can be disposed in close contact with, and bonded to, device 12 within weld area 44. Weld area 44 can be located in a low flexion portion of cushion 21 in order to reduce fatigue stress in coil 34 and increase the life of device 12. For example, device 12 can be located away from forefoot portion 28 (FIG. 1), which undergoes a high volume of flexion wear during the life of shoe 10, and away from heel portion 32 (FIG. 1), which undergoes a high volume of impact wear during the life of shoe 10.

Another type of air bladder which ca be used in conjunction with device 12 employs three dimensional fabric as tensile members, such as those disclosed in U.S. Pat. Nos. 4,906,502 and 5,083,361 to Rudy, the entire contents of which are which are hereby incorporated by this reference for all purposes. The air bladders described in the Rudy patents have enjoyed considerable commercial success in NIKE, Inc. brand footwear under the name Tensile-Air® and Zoom™, and are thus susceptible to counterfeiting. Air bladders using fabric tensile members can virtually eliminate deep peaks and valleys, and the methods described in the Rudy patents have proven to provide an excellent bond between the tensile fibers and membrane layers. In addition, the individual tensile fibers are small and deflect easily under load so that the fabric does not interfere with the cushioning properties of air. The fibers additionally provide a space where device 12 of the present disclosure can be incorporated during manufacture, as discussed with reference to FIG. 5.

Figure 5:
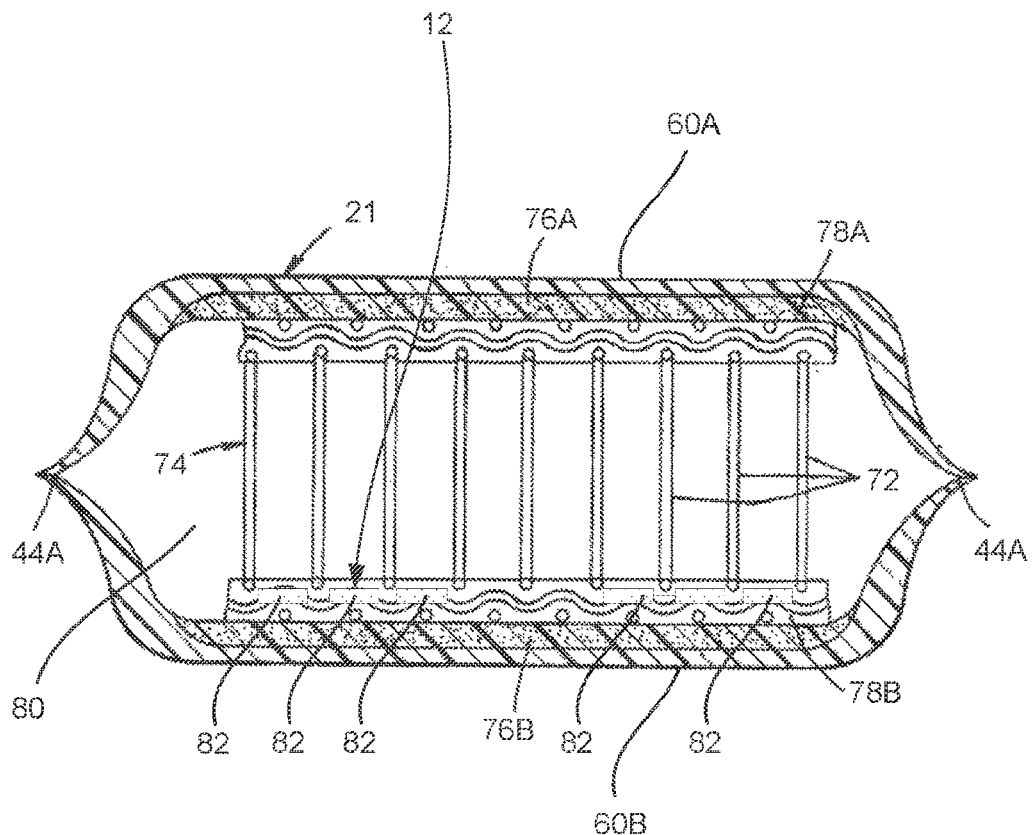
FIG. 5 is a cross sectional view of another embodiment of a cushion having vertically extending tensile members connecting plies of an air bladder with an NFC antenna interwoven with the tensile members.

FIG. 5 is a cross sectional view of another embodiment of air cushion 21 having vertically extending tensile members 72 of tensile fiber assembly 74 connecting membranes 60A and 60B, with NFC device 12 interwoven with tensile members 72. Tensile fiber assembly 74 can connect to membranes 60A and 60B using bonding agent layers 76A and 76I. Tensile members 72 can be assembled into tensile fiber assembly 74 using fabric layers 78A and 78B deposited within chamber 80. Windings 82 of NFC device 12 can be incorporated into one or both of fabric layers 78A and 78B.

Cushion 21 can be a composite structure in which an outer semi-permeable membrane 60A and an inner semi-permeable membrane 60B define pressure tight sealed chamber 80 in which a tensile load-bearing structure. e.g. tensile fiber assembly 74, can be disposed. Tensile fiber assembly 74 can comprise tensile members 72 extending between fabric layers 78A and 78B. Fabric layers 78A and 78B provide support to tensile members 72. For example, tensile members 72 can comprise one or more long strands threaded between fabric layers 78A and 78B, or multiple strands each individually connected to fabric layers 78A and 78B. Individual windings 82 of device 12 can be interspersed between tensile members 72. In one example, windings 82 can be located within fabric layer 78B, as shown, or fabric layer 78A. However, in other embodiments, windings 82 can be located on an exterior surface of fabric layer 78A or 78B and held in place with an adhesive, stitching or the like. For example, windings 82 can be printed onto fabric layer 78A and/or fabric layer 78B using a conductive ink and digital or screen printing techniques.

In the completed structure indicated for example in FIG. 5, portions of membranes 60A and 60B can be rendered molten for purposes of bonding with bonding agent layers 76A and 76B. The application of heat to membranes 60A and 60B during manufacturing is preferably controlled so that bonding agent layers 76A and 76B are the only parts of the structure which become molten. Periphery weld 44A can hermetically seal chamber 80 and can extend entirely around the periphery of cushion 21 to achieve a pressure tight enclosure. Weld 44A can be made as close as possible to the edge of membranes 60A and 60B without trapping any of fabric layers 78A and 78B in the weld itself. If desired, the sides of fabric layers 78A and 78B may be treated with chemical coupling agents such as silanes (DOW X16106) to improve adhesion.

Windings 82 can wind between tensile members 72 in a spiral fashion and can connect to microchip 36 (FIG. 2). Fabric layers 78A and 78B can provide a platform upon which device 12 can be built to support windings 82 and to contain device 12 within the sealed environment of air cushion 21. Windings 82 can be incorporated into fabric layers 78A and 78B during manufacture of tensile fiber assembly 74. Alternatively, windings 82 can be threaded into fabric layers 78A and 78B after tensile fiber assembly 74 is manufactured. Fabric layers 78A and 788 can stabilize winding 82 during impacting of cushion 21, while the pressurization of chamber 80 can provide protection to device 12 from impact and the environment.

Figure 6A:
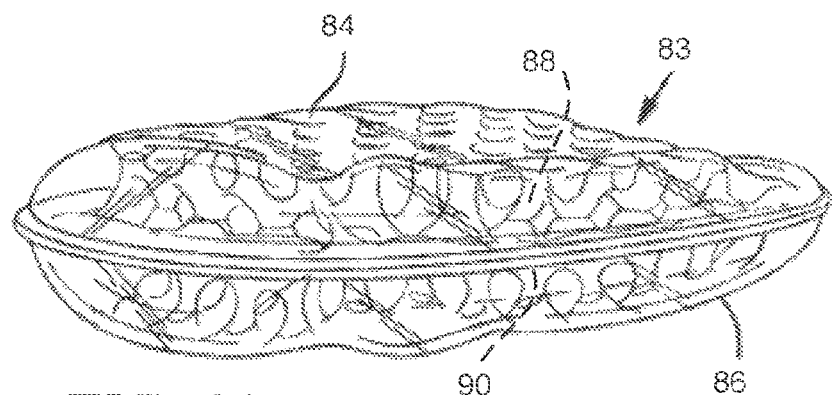
FIGS. 6A-6C show perspective, plan and cross-section views of a cushion having a four-ply air bladder configured as a heel cushion into which an NFC antenna can be incorporated.
Figure 6B:
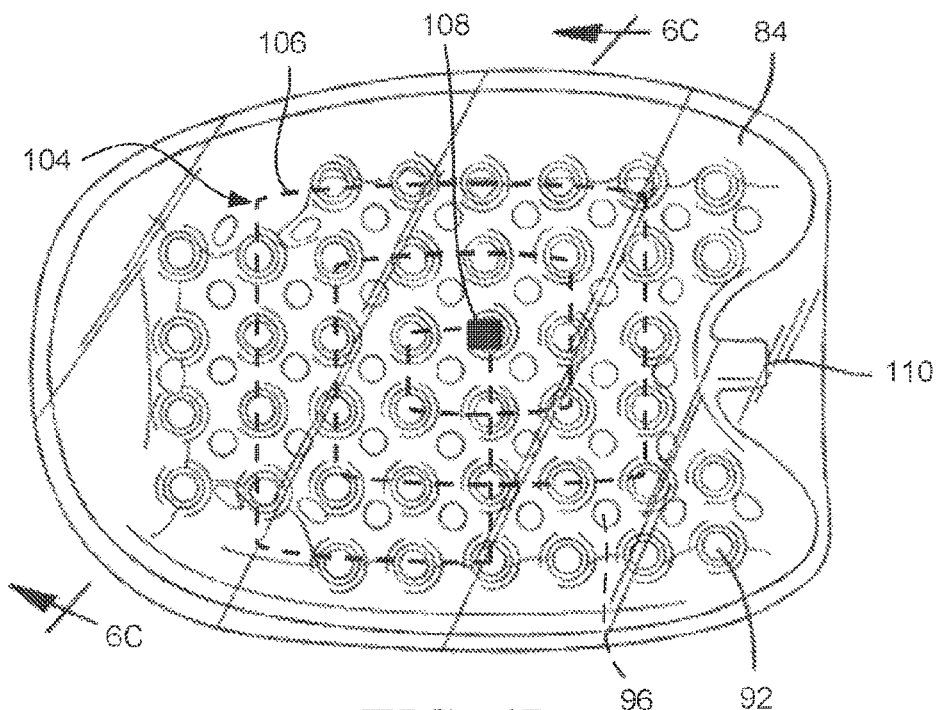
Figure 6C:
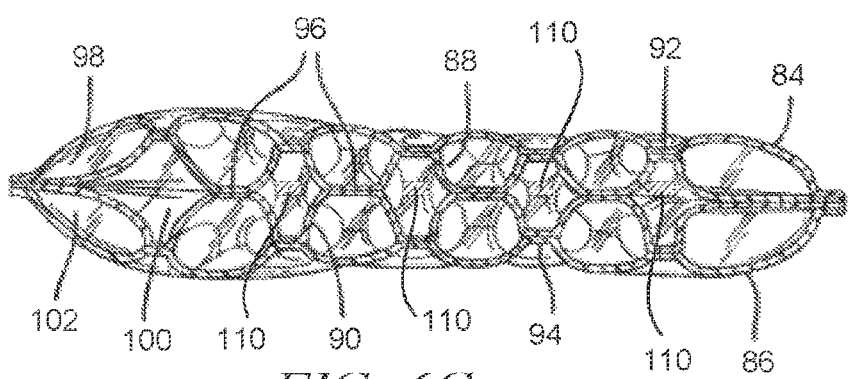

FIGS. 6A-6C show a relatively simple four film layer bladder 83 that can have film layers 84, 86, 88 and 90 generally arranged in an orthogonal array. Bladder 82 can comprise outer film layers 84 and 86 which can be attached to inner film layers 88 and 90 at upper connection sites 92 and lower connection sites 94, respectively. Inner film layers 88 and 90 can be attached to one another at connection sites 96 which are incoincident, that is, not in alignment, with their respective connection sites 92, 94 to the outer film layers. As illustrated in the sectional view of FIG. 6C, this can result in inner layers 88 and 90 extending between outer layers 84 and 86, and acting as a tensile member for bladder 83. Four film layers can result in bladder 83 having three vertically stacked fluid layers through any cushioning profile: first outer fluid layer 98; middle fluid layer 100 and second outer fluid layer 102.

Communication device 104 can be disposed within film layers 84-90 and can include antenna 106 and microchip 108. Windings 110 of antenna 106 can be disposed within middle fluid layer 100, first outer fluid layer 98 or second outer fluid layer 102. In the illustrated embodiment, windings 110 can be spirally wound through middle fluid layer 100. As such, windings 110 can be located within tensile members connecting outer film layers 84 and 86. In one example, windings 110 can be free-standing within bladder 83. In another example, windings 110 can be printed onto one of film layers 84-90 using a conductive ink and digital or screen printing techniques.

In the embodiment of FIGS. 6A-6C, middle fluid layer 100 can comprise a series of tubular spaces filled with fluid. In a simple form, these three fluid layers can be pressurized to different pressures to obtain a desired cushioning profile. For instance, if a soft-firm-soft profile were desired as one giving the best cushioning feel to a wearer while providing high pressure fluid in the middle fluid layer for responding to high impact loads, the outer fluid layers could be pressurized to P1 with the inner fluid layer being pressurized to P2, where P1<P2. Alternatively, all three fluid layers could be pressurized to different pressures to further customize the cushioning profile.

In one particular example, bladder 83 can be well suited for use in heel portion 32 of shoe 10 (FIG. 1) with the curved semicircular end being aligned with the rear portion of a wearer's heel. In this manner, stem 110 would be located near the arch area of a wearer's foot. Stein 110 could be located at any convenient peripheral location, and would likely be removed altogether once bladder 82 is filled with fluid and the stem area sealed. In other examples, bladder 83 can be used in mid-foot portion 30 or forefoot portion 28 of shoe 10 (FIG. 1). In one particular example, bladder 83 is positioned so that communication device 104 is located in an arch location to avoid direct impact between from a heel or ball of a foot.

The embodiments described heretofore are partial foot bladders of relatively simple construction using circular dot welds as connection sites 92, 94 and 96. The principles of the multiple film layer and multiple fluid layer bladder can be applied to any suitable bladder shape and application. The dot welds forming connection sites 92, 94 and 96 can provide spaces within bladder 83 that readily receive and protect device 104. First outer fluid layer 98, middle fluid layer 100 and second outer fluid layer 102 can provide hermetically sealed spaces that protect and cushion antenna 106 and microchip 108.

Figure 7A:
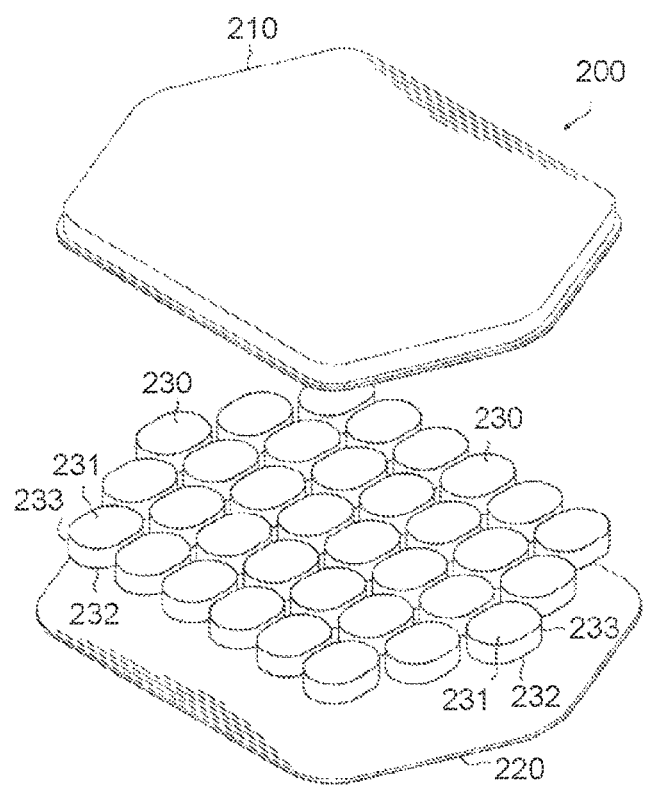
FIG. 7A is an exploded perspective view of a cushioning element having pad components disposed between outer covering layers.
Figure 7B:
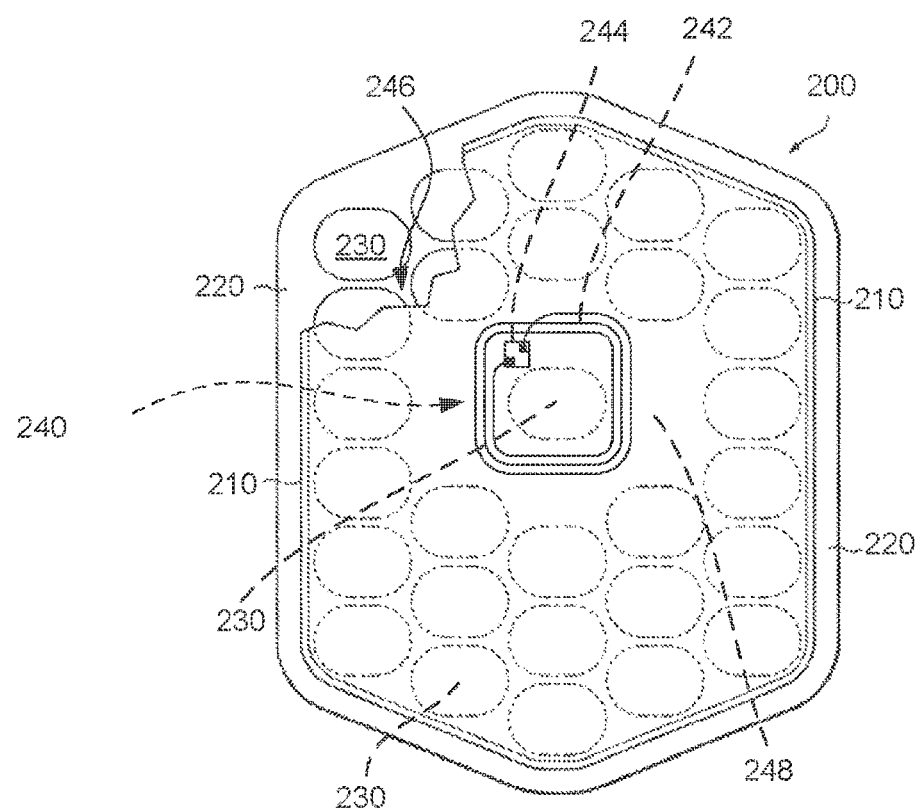
FIG. 7B is a partially cut-away top plan view of the cushioning element of FIG. 7A having pad components removed to provide space for an NFC antenna.

FIGS. 7A and 7B show yet another embodiment of a cushion in which an electronic communication device may be incorporated. Cushioning element 200 can include first material layer 210, second material layer 220, and a plurality of pad components 230. Each of pad components 230 has first surface 231, an opposite second surface 232, and a side surface 233 that extends between surfaces 231 and 232. Antenna 240, having coil 242 and microchip 244, is embedded within cushioning element 200, as shown only in FIG. 7B for simplicity.

First material layer 210 and second material layer 220 can cooperatively form an outer surface or covering for cushioning element 200. That is, first material layer 210 and second material layer 220 can cooperatively form pocket 246 or void, in which pad components 230 are located. Whereas second material layer 220 is depicted as having a generally planar configuration, first material layer 210 extends over pad components 230 and also along sides of pad components 230 to join with second material layer 220 (e.g., through stitching, an adhesive, or thermal bonding). Cushioning element 200 can be incorporated into articles of footwear m a variety of ways.

A variety of materials can be utilized for first material layer 210 and second material layer 220, including various textiles, polymer sheets, leather, or synthetic leather, for example. Combinations of these materials (e.g., a polymer sheet bonded to a textile) can also be utilized for material layers 210 and 220. Although material layers 210 and 220 may be formed from the same material, each of material layers 210 and 220 may also be formed from different materials. With regard to textiles, material layers 210 and 220 can be formed from knitted, woven, non-woven, spacer, or mesh textile components that include rayon, nylon, polyester, polyacrylic, elastane, cotton, wool, or silk, for example. Moreover, the textiles can be non-stretch, may exhibit one-directional stretch, or may exhibit multi-directional stretch.

Pad components 230 can be located between and secured to each of material layers 210 and 220. Each of pad components 230 can have first surface 231 secured to first material layer 210, an opposite second surface 232 secured to second material layer 220, and a side surface 233 that extends between surfaces 231 and 232. Although the shapes of pad components 230 can vary significantly, each of surfaces 231 and 232 are depicted as having an elliptical or generally elongate shape with rounded end areas, and side surface 233 extends in a generally straight fashion between surfaces 231 and 232. Pad components 230 are also depicted as being spaced evenly from each other and arranged in rows, particularly offset rows, but can be spaced or located in a variety of arrangements. An advantage of arranging pad components 230 in offset rows is that the area between pad components 230 is effectively minimized, while retaining a regular spacing between adjacent pad components 230.

Pad components 230 can be selectively omitted to provide space 248 within pocket 246 for other components, such as antenna 240. As discussed in the aforementioned 931 patent to Turner, pad components can be formed, in shape and quantity, using a die cutting element. As such, it can be simple to alter the pattern of the die cutting element to provide spaces having shapes suitable for positioning components, such as antenna 240, inside of cushioning element 200. Antenna 240 can be immobilized within space 248 via any suitable means, such as adhesive or stitching, or by having strands of coil 242 threaded through pad components 230. Coil 242 and microchip 244 can be disposed on a substrate to facilitate positioning between pad components 230. In one example, coil 242 can be printed onto one of layers 210 and 220 using a conductive ink and digital or screen printing techniques and, thus, can be positioned in small spaces between pad components 230.

A variety of materials can be utilized for pad components 230, including various polymer foam materials that return to an original shape after being compressed. Examples of suitable polymer foam materials for pad components 230 include polyurethane, ethylvinylacetate, polyester, polypropylene, and polyethylene foams. Moreover, both thermoplastic and thermoset polymer foam materials can be utilized. In some configurations of cushioning element 200, pad components 230 can be formed from a polymer foam material with a varying density, or solid polymer or rubber materials may be utilized Fluid-filled chambers can also be utilized as pad components 230. Also, different pad components 230 can be formed from different materials, or can be formed from similar materials with different densities.

The compressible polymer foam materials forming pad components 230 can attenuate impact forces that compress or otherwise contact cushioning element 200, thereby protecting antenna 240. When incorporated into an article of footwear, or another article of apparel, for example, the polymer foam materials of pad components 230 can compress to protect a wearer from contact with others, equipment, or the ground. Accordingly, cushioning element 200 may be utilized to provide cushioning or protection to areas of an individual or to components stored in space 248, such as antenna 240.

In addition to attenuating impact forces, cushioning element 200 has an advantage of simultaneously providing one or more of breathability, flexibility, and a relatively low overall mass. When incorporated into an article of footwear, such as shoe 10, a wearer may perspire and generate excess heat. By utilizing a permeable textile for material layers 210 and 220 and also forming gaps between adjacent pad components 230, areas for air to enter shoe 10 and for moisture to exit shoe 10 can be formed through cushioning element 200. More particularly, air and moisture can pass through material layers 210 and 220 and between pad components 230 to impart breathability to areas of shoe 10 having cushioning element 200. Moreover, the materials and structure discussed above for cushioning element 200 can impart flexibility and a low overall mass to cushioning element 200. Accordingly, cushioning element 200 can simultaneously provide impact force attenuation, breathability, flexibility, and a relatively low overall mass to an article of apparel.

ADDITIONAL NOTES

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Unless otherwise stated, or otherwise clear from the context below, directional terms used herein, such as rearwardly, forwardly, top, bottom, inwardly, downwardly, upwardly, etc., refer to directions relative to footwear 10 itself. Shoe 10 is shown in FIG. 1 to be disposed substantially horizontally, as it would be positioned on a horizontal surface when worn by a wearer. However, it is to be appreciated that shoe 10 need not be limited to such an orientation. Thus, in the illustrated embodiment of FIG. 1, rearwardly is toward heel portion 32, that is, to the left as seen in FIG. 1. Naturally, forwardly is toward forefoot portion 28, that is, to the right as seen in FIG. 1, and downwardly is toward the bottom of the page as seen in FIG. 1. Top refers to elements toward the top of the page as seen in FIG. 1, while bottom refers to elements toward the bottom of the page as seen m FIG. 1. Inwardly is toward the center of shoe 10, and outwardly is toward the outer peripheral edge of shoe 10.

EXAMPLES

The following example embodiments are provided without limitation on the disclosure herein.

In Example 1, an article of footwear can comprise: an upper, and a sole assembly connected to the upper to form a receptacle for a human foot, the sole assembly can comprise: a cushion comprising an exterior wall that forms an enclosure; an antenna disposed within the enclosure; and a microchip connected to the antenna.

In Example 2, the article of footwear of Example 1 optionally further includes an antenna and microchip that comprise a near field communication device.

In Example 3, the article of footwear of any one or more of Examples 1 and 2 optionally further includes a cushion that can comprises an inflatable bladder filled with a gas.

In Example 4, the article of footwear of any one or more of Examples 1-3 optionally further includes a cushion that can comprise at least two plies of a laminate joined at a weld area.

In Example 5, the article of footwear of any one or more of Examples 1-4 optionally further includes and antenna that can be disposed in the weld area.

In Example 6, the article of footwear of any one or more of Examples 1-5 optionally further includes a weld area that can encapsulates the antenna and the microchip.

In Example 7, the article of footwear of any one or more of Examples 1-6 optionally further includes a weld area that can be located in an arch portion of the article of footwear.

In Example 8, the article of footwear of any one or more of Examples 1-7 optionally further includes two plies of the laminate that can be joined to form the inflatable bladder, and an antenna that can be disposed in the inflatable bladder.

In Example 9, the article of footwear of any one or more of Examples 1-8 optionally further includes an inflatable bladder that can include a plurality of tensile fibers connecting the two plies, and the antenna is interwoven with the tensile fibers.

In Example 10, the article of footwear of any one or more of Examples 1-9 optionally further includes an antenna that can be disposed within a fabric layer connecting the plurality of tensile fibers.

In Example 11, the article of footwear of any one or more of Examples 1-10 optionally further includes a cushion comprises four plies of laminate joined at weld locations and the antenna is disposed between adjacent plies of the bladder.

In Example 12, the article of footwear of any one or more of Examples 1-11 optionally further includes an antenna that can be wound between tensile members connecting portions of the exterior wall.

In Example 13, the article of footwear of any one or more of Examples 1-12 optionally further includes a cushion that can include a forefoot portion, a mid-foot portion and a heel portion.

In Example 14, the article of footwear of any one or more of Examples 1-13 optionally further includes an antenna that can be printed directly onto a surface of the cushion.

In Example 15, a system comprising the article of footwear of any one or more of claims 1-14 and an external interrogation device that can be configured to communicate wirelessly with the antenna.

In Example 16, a method of manufacturing of article of footwear, the method can comprise: positioning an electronic communication device between two plies of polymer laminate; heating the two plies of polymer laminate to form a weld area and a cushion area, wherein the electronic communication device becomes encapsulated between the two plies of polymer laminate; inflating the cushion area with a gas; and sealing the cushion area.

In Example 17, the method of manufacturing of Example 16 optionally further includes a weld area that can include the electronic communication device.

In Example 18, the method of manufacturing of any one or more of Examples 16 and 17 optionally further includes a cushion area that can include the electronic communication device.

In Example 19, the method of manufacturing of any one or more of Examples 16-18 optionally further includes disposing a tensile fiber assembly between the two plies of polymer laminate, and interweaving an antenna of the electronic communication device within fibers of the tensile fiber assembly.

In Example 20, the method of manufacturing of any one or more of Examples 16-19 optionally further includes interweaving the antenna of the electronic communication device within fabric layers joining the fibers.

In Example 21, the method of manufacturing of any one or more of Examples 16-20 optionally further includes encapsulating the electronic communication device between two additional layers of polymer laminate.

In Example 22, the method of manufacturing of any one or more of Examples 16-21 optionally further includes printing an antenna of the electronic communication device directly onto one of the plies of polymer laminate before welding.

What is claimed is:

1. A method of manufacturing an article of footwear, the method comprising:
programming authentication information into an electronic communication device, wherein the authentication information comprises manufacturing origin information;
positioning the electronic communication device between two plies of polymer laminate;
heating the two plies of polymer laminate to form a weld area and a cushion area, wherein the electronic communication device becomes encapsulated between the two plies of polymer laminate;
inflating the cushion area with a gas;
interweaving an antenna of the electronic communication device within the cushion area to form a coil winding such that windings of the coil winding are free-standing within the gas of the cushion area;
sealing the cushion area such that the two plies of polymer laminate form a cushion;
embedding the cushion within a midsole of the article of footwear; and
programming the electronic communication device with ownership information for the article of footwear.

2. The method of manufacturing an article of footwear of claim 1, wherein the cushion area includes the electronic communication device.

3. The method of manufacturing an article of footwear of claim 2, further comprising:
disposing a tensile fiber assembly between the two plies of polymer laminate; and
interweaving an antenna of the electronic communication device within fibers of the tensile fiber assembly;
wherein coil windings of the antenna are positioned between tensile members of the tensile fiber assembly.

4. The method of manufacturing an article of footwear of claim 1, further comprising encapsulating the electronic communication device between two outer layers of polymer laminate surrounding the two plies of polymer laminate so that the electronic communication device is positioned between upper and lower fluid layers formed on opposite sides of the two plies of polymer laminate where the electronic communication device is encapsulated within the cushion.

5. The method of manufacturing an article of footwear of claim 1, wherein:
the electronic communication device comprises an antenna comprising a coil winding; and
the method further comprises concealing the electronic communication device and the antenna from external viewing within the midsole via foam encapsulation such that the electronic communication device is bounded by material of the midsole.

6. The method of manufacturing an article of footwear of claim 1, further comprising completely encapsulating the electronic communication device within an inflatable bladder at least partially defined by the two plies of polymer laminate forming the cushion area such that the inflatable bladder is pressurized by nitrogen gas after the electronic communication device has been programmed with the authentication information and before the electronic communication device has been programmed with the ownership information.

7. A method of manufacturing an article of footwear, the method comprising:
- programming authentication information into an electronic communication device;
- positioning the electronic communication device between two plies of polymer laminate;
- encapsulating the electronic communication device within an air cushion formed of the two plies of polymer laminate such that the electronic communication device is completely encapsulated within a joint area joining the two plies of polymer laminate, wherein the joint area encompasses different portions of the two plies of polymer laminate that are flush against each other and flush against the electronic communication device; and
- encapsulating the air cushion within a midsole of the article of footwear.

8. The method of claim 7, wherein encapsulating the electronic communication device within the air cushion comprises forming an enclosure from the two plies of polymer laminate and filling the enclosure with pressurized nitrogen gas.

9. The method of claim 8, wherein encapsulating the electronic communication device within the air cushion further comprises:
- heating the two plies of polymer laminate to form a weld area and a cushion area forming the enclosure, wherein the electronic communication device becomes encapsulated between the two plies of polymer laminate;
- inflating the cushion area with the pressurized nitrogen gas; and
- sealing the cushion area.

10. The method of claim 7, wherein encapsulating the electronic communication device within the air cushion further comprises concealing the electronic communication device from external viewing within the air cushion.

11. The method of claim 7, wherein the electronic communication device comprises an antenna positioned completely in flush engagement between the two plies of polymer laminate in the joint area.

12. The method of claim 7, wherein the authentication information comprises manufacturing origin information.

13. The method of claim 7, wherein the authentication information comprises ownership information.

14. A method of manufacturing an article of footwear, the method comprising:
- programming authentication information into an electronic communication device, wherein the authentication information comprises manufacturing origin information;
- positioning the electronic communication device between two plies of polymer laminate;
- heating the two plies of polymer laminate to form a weld area and a cushion area, wherein the electronic communication device becomes encapsulated between the two plies of polymer laminate;
- inflating the cushion area with a gas;
- sealing the cushion area such that the two plies of polymer laminate form a cushion;
- encapsulating the electronic communication device between two outer layers of polymer laminate surrounding the two plies of polymer laminate so that the electronic communication device is positioned between upper and lower fluid layers formed on opposite sides of the two plies of polymer laminate where the electronic communication device is encapsulated within the cushion area;
- embedding the cushion within a midsole of the article of footwear; and
- programming the electronic communication device with ownership information for the article of footwear.

* * * * *

UNITED STATES PATENT AND TRADEMARK OFFICE
CERTIFICATE OF CORRECTION

| | |
|---|---|
| PATENT NO. | : 11,766,088 B2 |
| APPLICATION NO. | : 16/874051 |
| DATED | : September 26, 2023 |
| INVENTOR(S) | : Jacobsen et al. |

It is certified that error appears in the above-identified patent and that said Letters Patent is hereby corrected as shown below:

On the Title Page

In item (57), in "Abstract", in Column 2, Line 1, delete "upper," and insert --upper;-- therefor In item (57), in "Abstract", in Column 2, Line 12, delete "laminate," and insert --laminate;-- therefor Signed and Sealed this
Twelfth Day of December, 2023

Katherine Kelly Vidal
*Director of the United States Patent and Trademark Office*